(12) United States Patent
Paske et al.

(10) Patent No.: US 10,998,703 B1
(45) Date of Patent: May 4, 2021

(54) CABLE ROUTING AND BEND RADIUS DEFINING TOOL

(71) Applicant: INTERNATIONAL BUSINESS MACHINES CORPORATION, Armonk, NY (US)

(72) Inventors: Ryan Paske, Oronoco, MN (US); Steven Charles Erickson, Rochester, MN (US); Donald Hrtanek, Mantorville, MN (US); Clinton William Erie, Adams, MN (US); Michael John MacPherson, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/801,261

(22) Filed: Feb. 26, 2020

(51) Int. Cl.
*H02G 3/04* (2006.01)
*H02G 15/007* (2006.01)

(52) U.S. Cl.
CPC ........... *H02G 3/045* (2013.01); *H02G 15/007* (2013.01)

(58) Field of Classification Search
CPC .................................................. G02B 6/4447
See application file for complete search history.

(56) References Cited

U.S. PATENT DOCUMENTS

| | | | | |
|---|---|---|---|---|
| 4,114,043 A | * | 9/1978 | Gansfried | A61B 6/56 174/69 |
| 4,726,534 A | * | 2/1988 | Chenoweth | B65H 75/22 242/578.2 |
| 5,149,017 A | * | 9/1992 | McEntire | B64F 1/305 14/71.5 |
| 5,237,640 A | | 8/1993 | Pedraza | |
| 5,679,925 A | * | 10/1997 | Dilley | H02G 11/02 174/53 |
| 5,746,389 A | * | 5/1998 | Willmann | B65H 75/36 174/69 |
| 5,987,203 A | * | 11/1999 | Abel | G02B 6/3825 385/134 |
| 6,071,446 A | | 6/2000 | O'Brien | |
| 6,076,779 A | | 6/2000 | Johnson | |
| 6,263,141 B1 | | 7/2001 | Smith | |

(Continued)

FOREIGN PATENT DOCUMENTS

| | | |
|---|---|---|
| CN | 102870026 B | 7/2016 |
| JP | 2013190728 A | 9/2013 |
| JP | 2019013108 A | 1/2019 |

*Primary Examiner* — William H. Mayo, III
*Assistant Examiner* — Krystal Robinson
(74) *Attorney, Agent, or Firm* — Tihon Poltavets (57) ABSTRACT

A cable configuration tool includes an attachment base, a first cable retainer, a second cable retainer, and a cable guide. The attachment base includes an attachment point for mounting to an edge of an enclosure and an arm for mounting the first cable retainer, the second cable retainer, and the cable guide. A first aperture of the first cable retainer, a second aperture of the second cable retainer, and a third aperture of the cable guide are each configured to accept the arm of the attachment base, where the first cable retainer, the second cable retainer, and the cable guide are slidable along the arm. One or more cables for creation of a cable harness are placeable along an outer edge of the cable guide, where the cable guide defines a bend radius for the one or more cables of the cable harness.

17 Claims, 6 Drawing Sheets

(56) References Cited

U.S. PATENT DOCUMENTS

| | | | |
|---|---|---|---|
| 6,289,160 B1 | 9/2001 | Daoud | |
| 6,353,698 B1* | 3/2002 | Talamini, Sr. | G02B 6/3636 |
| | | | 174/153 G |
| 6,640,041 B2* | 10/2003 | Ichinari | G02B 6/4457 |
| | | | 242/388.1 |
| 6,676,069 B1* | 1/2004 | Davis | B65H 75/146 |
| | | | 242/405.2 |
| 6,868,216 B1 | 3/2005 | Gehrke | |
| 6,930,244 B1* | 8/2005 | Nebel | B60R 16/0207 |
| | | | 174/486 |
| 7,083,051 B2* | 8/2006 | Smith | G02B 6/4452 |
| | | | 211/26 |
| 7,229,042 B2* | 6/2007 | Thebault | G02B 6/4457 |
| | | | 242/388.1 |
| 7,298,951 B2* | 11/2007 | Smrha | G02B 6/4452 |
| | | | 385/135 |
| 7,473,850 B2 | 1/2009 | Glew | |
| 7,660,117 B2 | 2/2010 | Werner | |
| 7,715,679 B2* | 5/2010 | Kowalczyk | G02B 6/4477 |
| | | | 385/135 |
| 7,756,379 B2* | 7/2010 | Kowalczyk | G02B 6/3897 |
| | | | 385/135 |
| 7,922,129 B2* | 4/2011 | Rapp | G02B 6/4459 |
| | | | 248/68.1 |
| 8,003,890 B2 | 8/2011 | Donowho | |
| 8,167,146 B2* | 5/2012 | Yu | H05K 7/1491 |
| | | | 211/26 |
| 8,344,247 B2* | 1/2013 | Sayres | H02G 3/02 |
| | | | 174/50 |
| RE45,153 E * | 9/2014 | Hendrickson | G02B 6/4466 |
| | | | 385/135 |
| 8,821,030 B2 | 9/2014 | Donaldson | |
| 8,879,881 B2 | 11/2014 | Cote | |
| 9,042,700 B2* | 5/2015 | Smith | B65H 49/18 |
| | | | 385/135 |
| 9,140,871 B2* | 9/2015 | Milne | G02B 6/4452 |
| 9,146,374 B2* | 9/2015 | Ott | G02B 6/4465 |
| 9,170,392 B2* | 10/2015 | Krampotich | G02B 6/4457 |
| 9,188,760 B2* | 11/2015 | Kowalczyk | G02B 6/4446 |
| 9,478,963 B1* | 10/2016 | Klein | H02G 11/02 |
| 9,555,999 B2* | 1/2017 | Smith | B65H 75/22 |
| 9,913,397 B2* | 3/2018 | Miwa | H05K 7/1489 |
| 10,291,969 B2* | 5/2019 | Takeuchi | H04Q 1/02 |
| 10,359,590 B2* | 7/2019 | Haile-Mariam | G02B 6/4457 |
| 10,365,449 B2* | 7/2019 | Thompson | G02B 6/4454 |
| 10,505,356 B2* | 12/2019 | Dirisio | H05K 5/0247 |
| 10,712,517 B2* | 7/2020 | Parsons | G02B 6/44 |
| 2002/0092662 A1* | 7/2002 | Grant | H05K 7/1491 |
| | | | 174/50 |
| 2004/0035995 A1* | 2/2004 | Chen | H05K 7/1491 |
| | | | 248/282.1 |
| 2004/0146266 A1* | 7/2004 | Solheid | H04Q 1/064 |
| | | | 385/135 |
| 2006/0045458 A1* | 3/2006 | Sasaki | G02B 6/444 |
| | | | 385/135 |
| 2006/0237218 A1 | 10/2006 | Glew | |
| 2007/0036506 A1* | 2/2007 | Kewitsch | G02B 6/4457 |
| | | | 385/135 |
| 2008/0037945 A1* | 2/2008 | Gniadek | B65H 49/20 |
| | | | 385/135 |
| 2008/0094774 A1* | 4/2008 | Bucciferro | H01R 4/30 |
| | | | 361/220 |
| 2008/0203240 A1* | 8/2008 | Smrha | G02B 6/4453 |
| | | | 248/58 |
| 2008/0239693 A1* | 10/2008 | Hendrix | H05K 7/20563 |
| | | | 361/826 |
| 2008/0283683 A1* | 11/2008 | Utaki | H02G 11/00 |
| | | | 248/49 |
| 2008/0315030 A1* | 12/2008 | Hendrickson | B65H 49/327 |
| | | | 242/565 |
| 2009/0046429 A1 | 2/2009 | Werner | |
| 2009/0060441 A1* | 3/2009 | Kowalczyk | G02B 6/46 |
| | | | 385/135 |
| 2009/0136197 A1* | 5/2009 | Jensen | G02B 6/4457 |
| | | | 385/135 |
| 2009/0224110 A1 | 9/2009 | Donowho | |
| 2009/0230228 A1* | 9/2009 | Penumatcha | G02B 6/4457 |
| | | | 242/395 |
| 2010/0006317 A1* | 1/2010 | Hruby | H04Q 1/064 |
| | | | 174/97 |
| 2010/0158466 A1* | 6/2010 | Cassidy | G02B 6/4455 |
| | | | 385/135 |
| 2010/0166377 A1* | 7/2010 | Nair | G02B 6/4452 |
| | | | 385/135 |
| 2010/0166378 A1* | 7/2010 | Taylor | H04Q 1/021 |
| | | | 385/135 |
| 2010/0202746 A1* | 8/2010 | Sokolowski | G02B 6/389 |
| | | | 385/135 |
| 2010/0296789 A1* | 11/2010 | Womack | G02B 6/4471 |
| | | | 385/135 |
| 2010/0297873 A1* | 11/2010 | Burke | H02G 11/02 |
| | | | 439/501 |
| 2011/0135267 A1* | 6/2011 | Barker | G02B 6/4452 |
| | | | 385/135 |
| 2011/0150408 A1* | 6/2011 | Fewster | G02B 6/4459 |
| | | | 385/135 |
| 2011/0217006 A1 | 9/2011 | Donaldson | |
| 2011/0317971 A1* | 12/2011 | Zhang | H04Q 1/06 |
| | | | 385/135 |
| 2011/0317974 A1* | 12/2011 | Krampotich | G02B 6/4452 |
| | | | 385/135 |
| 2012/0039577 A1* | 2/2012 | Kimbrell | B65H 75/36 |
| | | | 385/135 |
| 2012/0043936 A1* | 2/2012 | Ferguson | B65H 75/48 |
| | | | 320/114 |
| 2012/0063735 A1* | 3/2012 | Nair | G02B 6/3897 |
| | | | 385/135 |
| 2012/0163760 A1* | 6/2012 | Abbiati | G02B 6/4475 |
| | | | 385/135 |
| 2013/0034336 A1* | 2/2013 | Cassell | G02B 6/4447 |
| | | | 385/135 |
| 2013/0094826 A1* | 4/2013 | Marsac | G02B 6/4466 |
| | | | 385/135 |
| 2013/0163943 A1* | 6/2013 | Coffey | G02B 6/46 |
| | | | 385/135 |
| 2013/0200193 A1* | 8/2013 | Lichoulas | B65H 75/285 |
| | | | 242/118.3 |
| 2013/0209052 A1* | 8/2013 | Subhash | G02B 6/4477 |
| | | | 385/136 |
| 2013/0306781 A1* | 11/2013 | Tong | B65H 75/4449 |
| | | | 242/388.1 |
| 2014/0090874 A1* | 4/2014 | Winkler | F16L 3/1218 |
| | | | 174/135 |
| 2014/0126869 A1* | 5/2014 | Loeffelholz | G02B 6/4446 |
| | | | 385/135 |
| 2014/0161411 A1* | 6/2014 | Slater | G02B 6/4457 |
| | | | 385/135 |
| 2014/0197261 A1* | 7/2014 | Witherbee | B65H 75/4476 |
| | | | 242/118.4 |
| 2015/0043882 A1* | 2/2015 | Schomisch | G02B 6/4446 |
| | | | 385/135 |
| 2015/0071596 A1* | 3/2015 | Elford | G02B 6/4441 |
| | | | 385/135 |
| 2015/0114708 A1* | 4/2015 | Rossman | H01R 13/648 |
| | | | 174/350 |
| 2015/0214703 A1* | 7/2015 | Larsen | G02B 6/4466 |
| | | | 174/481 |
| 2015/0286023 A1* | 10/2015 | Van Baelen | G02B 6/4466 |
| | | | 385/135 |
| 2015/0362092 A1* | 12/2015 | Grandidge | G02B 6/4452 |
| | | | 248/49 |
| 2016/0033733 A1* | 2/2016 | Burek | G02B 6/4457 |
| | | | 385/135 |
| 2016/0109675 A1* | 4/2016 | Ott | G02B 6/3897 |
| | | | 385/135 |
| 2016/0116697 A1* | 4/2016 | Kostecka | G02B 6/4455 |
| | | | 385/135 |
| 2017/0207615 A1* | 7/2017 | Trapassi | F16L 5/00 |
| 2017/0313544 A1* | 11/2017 | Parke | G02B 6/4463 |

(56) References Cited

U.S. PATENT DOCUMENTS

| | | | |
|---|---|---|---|
| 2018/0372977 A1* | 12/2018 | Vermeulen | G02B 6/4452 |
| 2019/0250359 A1* | 8/2019 | Yogeeswaran | G02B 6/486 |
| 2020/0140142 A1* | 5/2020 | Erickson | B65D 21/0212 |

* cited by examiner

FIG. 5B

CABLE ROUTING AND BEND RADIUS DEFINING TOOL

FIELD OF THE INVENTION

This disclosure relates generally to cabling routing, and in particular, to a cabling routing and bend radius defining configuration tool.

BACKGROUND OF THE INVENTION

Proper cable placement during manufacturing and installation of devices present on a computer system ensures that cables are arranged and secured in a repeatable, robust, organized, and serviceable manner. The arrangement and securement of the cables is based on a configuration of a device and typically has to adhere to cable specification (e.g., bend radii) to ensure cable integrated is maintained through the usage life of the cable. Certain types of cables, such as optical cables, are sensitive to bend radii and due to the high configurability nature of the devices on the computer system, there are typically variations in how these types of cables are positioned, installed, and secured.

SUMMARY

One aspect of an embodiment of the present invention discloses an apparatus for a cable configuration tool, the apparatus comprising an attachment base, a first cable retainer, a second cable retainer, and a cable guide, wherein the attachment base includes an attachment point for mounting to an edge of an enclosure, wherein the attachment base includes an arm for mounting the first cable retainer, the second cable retainer, and the cable guide. The apparatus further comprising a first aperture of the first cable retainer configured to accept the arm of the attachment base, wherein the first cable retainer is slidable along the arm. The apparatus further comprising a second aperture of the second cable retainer configured to accept the arm of the attachment base, wherein the second cable retainer is slidable along the arm. The apparatus further comprising a third aperture of the cable guide configured to accept the arm of the attachment base, wherein the cable guide is slidable along the arm and positioned between the first cable retainer and the second cable retainer. The apparatus further comprising, one or more cables for creation of a cable harness are placeable along an outer edge of the cable guide, wherein the cable guide defines a bend radius for the one or more cables.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Embodiments of the present invention provide a cable configuration tool for ensuring a cable harness is an appropriate length, containing a bend radius within specification of one or more cables comprising the cable harness, and secured utilizing one or more tie-off points in a repeatable manner. The cable configuration tool includes an attachment base, a first cable retainer, a second cable retainer, and a cable guide, where the cable guide is positioned between the first and second cable retainer on an arm of the attachment base. The attachment base is mountable and removable to an edge of an electronic component on an equipment rack and/or on the equipment rack itself. The cable guide provides a radius (e.g., 4 inches) of a portion (e.g., 210°) of a circular shape for the one or more cables being utilized for the creation of a bend radius for the cable harness, where the one or more cables are placeable on an outer edge of cable guide in a channel defined by a height different between the cable guide, and the first cable retainer and second cable retainer. The first and second cable retainers include one or more cavities (i.e., cutouts) for placing a fastener for securing the one or more cables to create the cable harness, where the one or more cables are disposed on the outer edge of the cable guide.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure or first member, is present on a second element, such as a second structure or second member, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Figure 1:
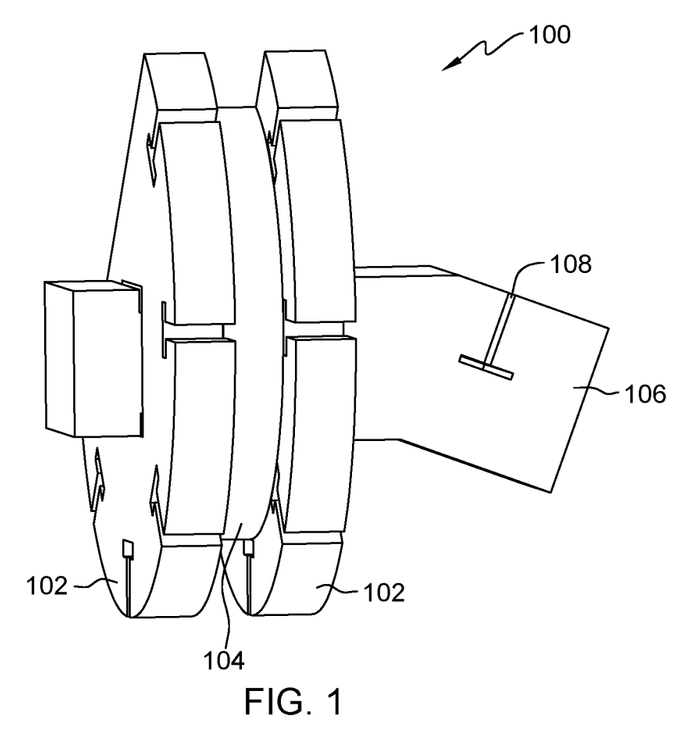
FIG. 1 depicts a 3-dimensional view of a cable configuration tool, in accordance with an embodiment of the present invention.

FIG. 1 depicts a 3-dimensional view of a cable configuration tool, in accordance with an embodiment of the present invention. In this embodiment, cable configuration tool 100 is associated with a specific machine configuration on a server rack for defining a cable bend radius of a cable harness utilized by the specific machine. Cable configuration tool 100 can further include two or more cable harness loop and tie off points for securing the cable harness. Cable configuration tool 100 includes two cable retainers 102 and cable guide 104 positioned on attachment base 106, where cable guide 104 is positioned between a first cable retainer 102 and a second cable retainer 102. Cable configuration tool 100 is mountable to an edge of an enclosure for the specific machine or server rack, where attachment point 108 of attachment base 106 slides onto the edge of the specific machine or server rack. The edge of the specific machine or sever rack represents a fixed point onto which cable configuration tool 100 is temporarily mounted during the cable harness installation process for the specific machine. Attachment point 108 is T-shaped to allow for cable configuration tool 100 to mount to edges of varying thickness without damaging the edge of the specific machine or server rack. Attachment point 108 can further include an integrated plastic clamp disposed in a cavity of the T-shaped attachment point 108, where the integrated plastic clamp presses against a first side and a second side of the edge of the enclosure for the specific machine or server rack.

In this embodiment, attachment base 106 is a pliable material that allows for the attachment point 108 to conform to edge of the specific machine or sever rack when mounted and allows for attachment point 108 to revert back to a previously established shape once dismounted from the edge of the specific machine or server rack. A shape of attachment point 108 is configurable according to a fixed point on the specific machine or server rack on which cable configuration tool 100 is temporarily mounted during the cable harness installation process. Channel 110 defined by the first cable retainer 102, the second cable retainer 102, and cable guide 104 represents an area in which two or more cables for the creation of a cable harness are temporarily disposed. It is to be noted, that cable configuration tool 100 can be reusable or disposable depending on a type of material utilized for the components (e.g., cable retainer 102, cable guide 104) comprising cable configuration tool 100 and/or whether a structural integrity of cable configuration tool 100 is compromised during the removal from the specific machine or server rack. Furthermore, cable configuration tool 100 can be removed upon completion of creating the cable harness or remain in place during a shipment of the specific machine or server rack, where cable configuration tool 100 is subsequently removed upon arrival at a destination location.

Figure 2:
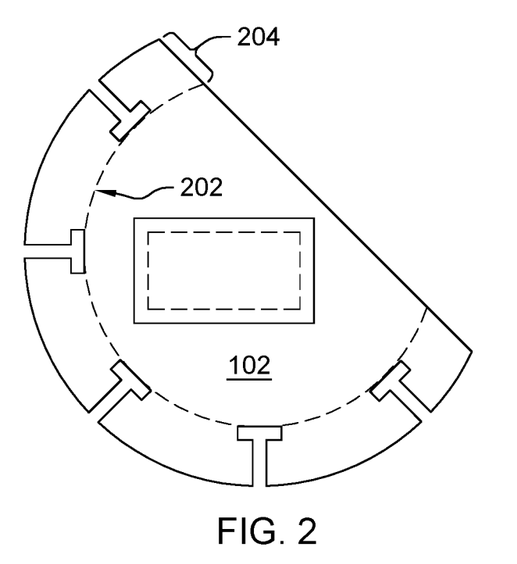
FIG. 2 depicts a front view of a cable configuration tool, in accordance with an embodiment of the present invention.

FIG. 2 depicts a front view of a cable configuration tool, in accordance with an embodiment of the present invention. In this embodiment, two or more cables are placed on outer edge 202 of cable guide 104, where outer edge 202 represents a partial circumference of cable guide 104. As previously discussed, cable guide 104 is positioned between a first retainer 102 and a second cable retainer 102, where cable guide 104 has a smaller radius than either of the first cable retainer 102 or the second cable retainer 102. In this embodiment, the first cable retainer 102 has the same radius as the second cable retainer 102, where height 204 represents the difference in the radius between cable retainer 102 and cable guide 104. A set of T-shaped cavities 206 are positioned around a circumference of the first cable retainer 102 and the second cable retainer 102 for providing cable harness loop and tie off points for securing the two or more cables to create the cable harness. Height 204 also defines a height of each of the T-shaped cavities 206, where outer edge 202 at least partially aligns with top surface 208 of each of the T-shaped cavities 206.

Figure 3A:
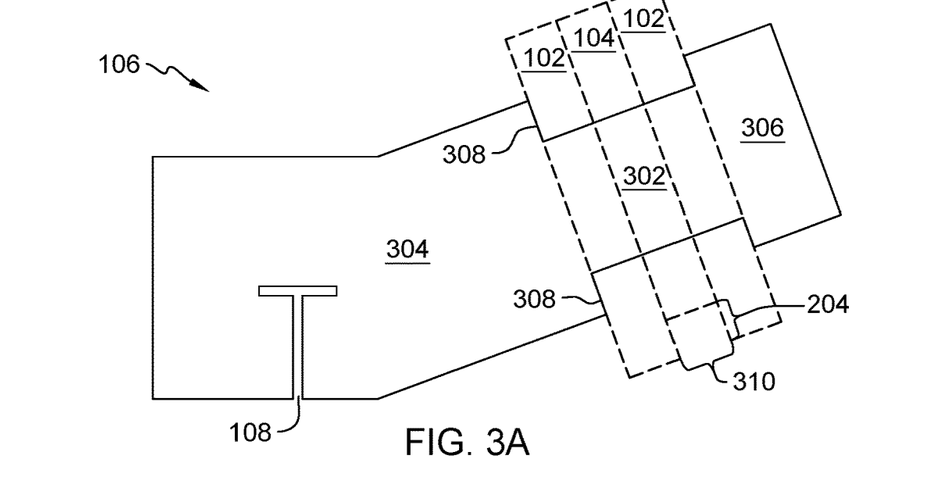
FIG. 3A depicts an attachment base of a cable configuration tool, in accordance with an embodiment of the present invention.

FIG. 3A depicts an attachment base of a cable configuration tool, in accordance with an embodiment of the present invention. As previously discussed, attachment base 106 includes attachment point 108 for temporary mounting cable configuration tool 100 onto the edge of a specific machine or server rack. Attachment base 106 includes recessed arm 302 between body 304 and securement body 306, where recessed arm 302 is a neck between body 304 and securement body 306 for mounting the first and second cable retainer 102 and cable guide 104. A length of recessed arm 302 is dependent on an amount of and thickness of each cable retainer 102 and cable guide 104 mounted to recessed arm 302. Channel 310 is defined by the first cable retainer 102, the second cable retainer 102, and cable guide 104, where width 312 of cable guide 104 and height 204 provides the dimensions of channel 310 in which two or more cables for creation of the cable harness are temporary disposed. In another embodiment, recesses arm 302 is long enough to accommodate two cable guides 104 and three cable retainers 102, where the two cable guides 104 are separate by a first cable retainer 102, a second cable retainer 102 is positioned at shoulder 308 near body 304, and a third cable retainer 102 is positioned near securement body 302. The two cable guides 104 allow for a simultaneous creation of two cable harness comprising of two or more cables each.

In this embodiment, the first and second cable retainer 102 and cable guide 104 are each pressed over securement body 306 and slide down recessed arm 302 until the first and second cable retainer 102 and cable guide 104 are pressed against shoulder 308 of body 302. Securement body 306 is constructed of deformable material (e.g., foam) that is capable of returning to a previously established shape (i.e., rectangle) when each of the first and second cable retainer 102 and cable guide 104 are each pressed over securement body 306. In another embodiment, securement body 306 is attachable and removable from recessed arm 302 of attachment base 106 utilizing an integrated bolt and nut combination, where a nut protruding from securement body 306 is insertable into a nut positioned on recessed arm 302.

Figure 3B:
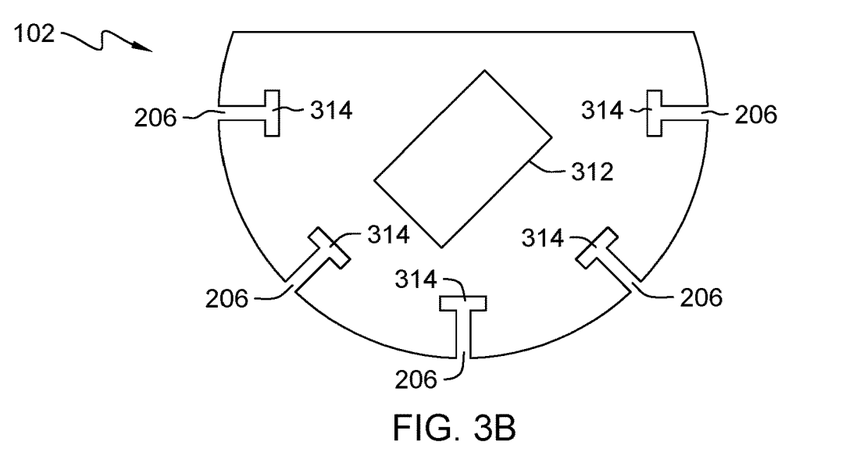
FIG. 3B depicts a cable retainer of a cable configuration tool, in accordance with an embodiment of the present invention.

FIG. 3B depicts a cable retainer of a cable configuration tool, in accordance with an embodiment of the present invention. A cross sectional shape of retainer aperture 312 of cable retainer 102 at least partially matches a cross sectional shape of recessed arm 302 of attachment base 106, where a cross section of retainer aperture 312 aligns with a cross section of recessed arm 302 when cable retainer 102 is disposed on recessed arm 302. Cable retainer 102 is mountable to attachment base 106 by inserting securement body 306 into retainer aperture 312 and sliding cable retainer 102 down recessed arm 302 until cable retainer 102 contacts shoulder 308 of body 302. As previously discussed, T-shaped cavities 206 are positioned around a circumference of the first cable retainer 102 and the second cable retainer 102 for providing cable harness loop and tie off points for securing the two or more cables to create the cable harness. Area 314 represents a portion of each T-shaped cavity 206 for placing a fastener for securing the two or more cable for creation of the cable harness, where the fastener can be a section of tape, a zip-tie, and a hook-and-loop fastener. Two or more cable retainer 102 mounted on recessed arm 302 are aligned in such a matter that each T-shaped cavity of a first cable retainer 102 aligns with another T-shaped cavity of a second cable retainer 102. During the cable creation process, the fastener can rest on outer edge 202 of cable guide 104 and area 314 of each T-shaped cavity 206, prior to the two or more cables being placed on cable guide 104. Alternatively, the two or more cable are placed on cable guide 104 and a fastener is inserted into each area 314 of T-shaped cavity 206 for retaining the two or more cables to create the cable harness.

Figure 3C:
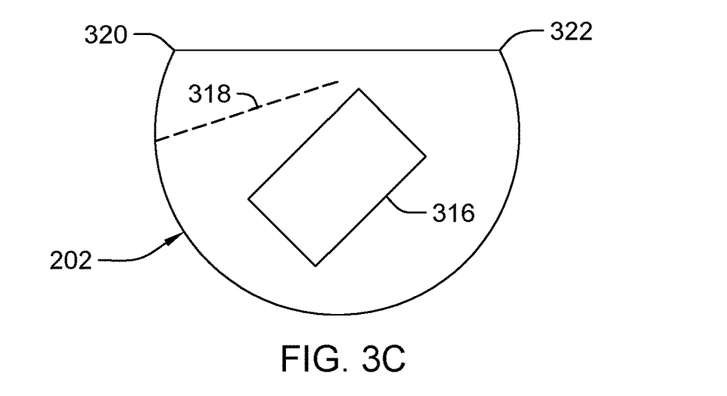
FIG. 3C depicts a cable guide of a cable configuration tool, in accordance with an embodiment of the present invention.

FIG. 3C depicts a cable guide of a cable configuration tool, in accordance with an embodiment of the present invention. A cross sectional shape of guide aperture 316 of cable guide 104 at least partially matches a cross sectional shape of recessed arm 302 of attachment base 106, where a cross section of guide aperture 316 aligns with a cross section of recessed arm 302 when cable guide 104 is disposed on recessed arm 302. Cable guide 104 is mountable to attachment base 106 by inserting securement body 306 into guide aperture 316 and sliding cable guide 104 down recessed arm 302 until cable guide 104 contacts a previously inserted cable retainer 102. Radius 318 of cable guide 104 represents a desired cable bend radius of the cable harness being created by the two or more cables disposed on outer edge 202 of cable guide 104. As previously discusses, radius 318 of cable guide 104 is less than a radius of cable retainer 102 to allow for the creation of channel 110 when cable guide 104 is positioned between a first cable retainer 102 and a second cable retainer 102 on recessed arm 302. In this embodiment, cable guide 104 allows for the creation of a 210° bend (i.e., bend degree) in the cable harness being created with the two or more cables, where the 210° of cable guide 104 bend is measured between point 320 and point 322 along outer edge 202. In other embodiments, cable guide 104 allows for the creation of a 90° bend, where the 90° bend of cable guide 104 is measure between point 320 and point 322 along outer edge 202. Furthermore, each of the first and the second cable retainer 102 can include a matching degree bend to cable guide 104.

Figure 4A:
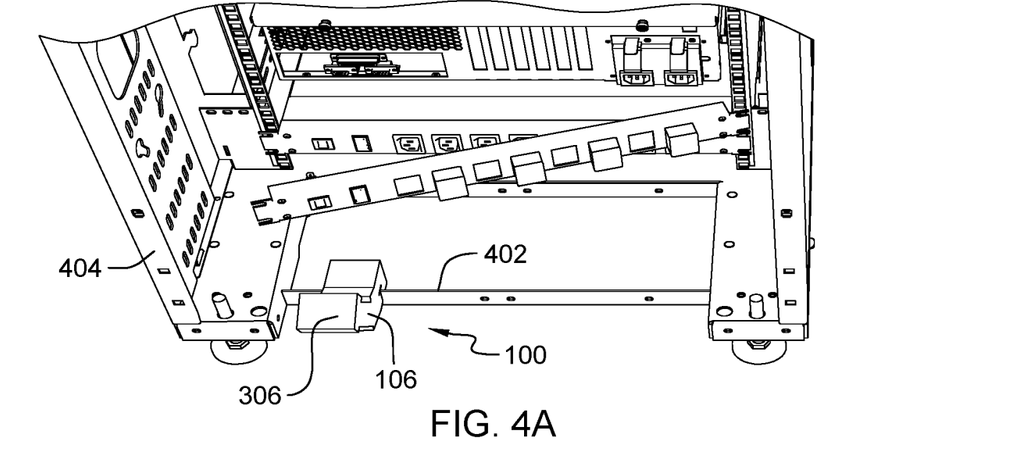
FIG. 4A depicts an attachment base of a cable configuration tool mounted to a server rack, in accordance with an embodiment of the present invention.

FIG. 4A depicts an attachment base of a cable configuration tool mounted to a server rack, in accordance with an embodiment of the present invention. A cable harness creation process includes an assembly of cable configuration tool 100 beginning with a mounting of attachment base 106 to edge 402 on equipment rack 404. A location on edge 402 for mounting attachment base 106 is based on a location of a radial bend for the cable harness being created from the two or more cables. As previously discussed, an attachment point on attachment base 106 can conform to edge 402 on equipment rack 404, such that attachment base 106 remains in a temporarily fixed position on equipment rack 404.

Figure 4B:
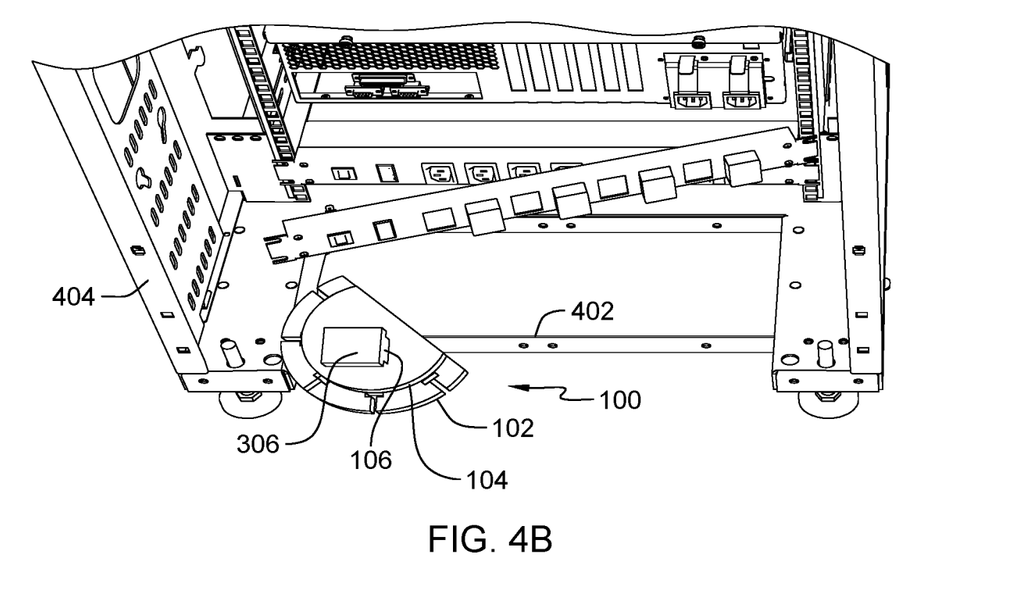
FIG. 4B depicts an attachment base with a first cable retainer and cable guide of a cable configuration tool mounted to a server rack, in accordance with an embodiment of the present invention.

FIG. 4B depicts an attachment base with a first cable retainer and cable guide of a cable configuration tool mounted to a server rack, in accordance with an embodiment of the present invention. Subsequent to mounting attachment base 106 to edge 402, a first cable retainer 102 and cable guide 104 are pressed over securement body 306, where cable guide 104 is disposed over the first cable retainer 102.

Figure 4C:
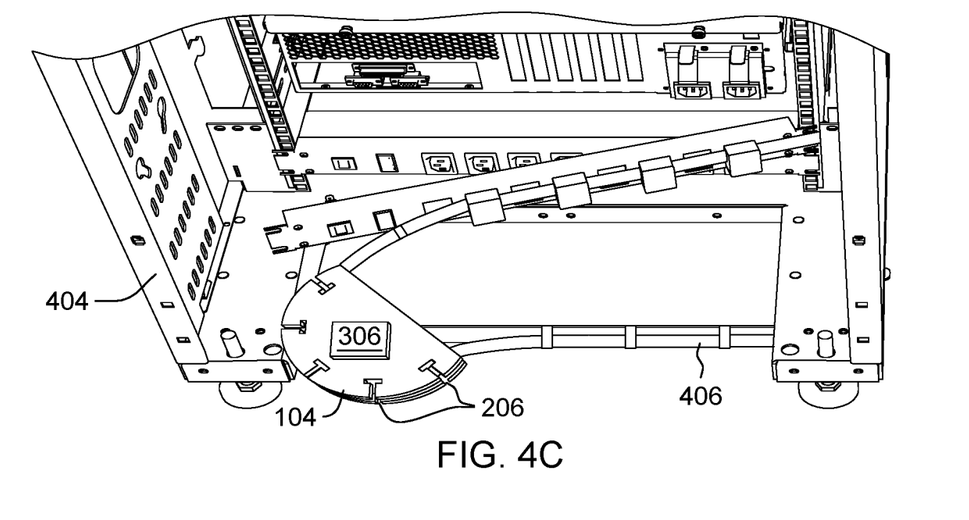
FIG. 4C depicts a secured cable disposed in a cable configuration tool mounted to a server rack, in accordance with an embodiment of the present invention.

FIG. 4C depicts a secured cable disposed in a cable configuration tool mounted to a server rack, in accordance with an embodiment of the present invention. A second cable retainer 102 is pressed over securement body 306, where the second cable retainer 102 is disposed over the cable guide 104. One or more cables of cable harness 406 are routed through a channel (i.e., channel 110) defined by the first cable retainer 102, the second cable retainer 102, and cable guide 104. T-shaped cavities 206 on the second cable retainer 102 allows for a user to insert fasteners to tie-off the two or more cables to create cable harness 406. In this embodiment, there are five T-shaped cavities 206 for five corresponding fasteners to tie-off the two or more cables to create cable harness 406. Cable configuration tool 100 allows for cable harness 406 to maintain a specified bend radius while other portions of cable harness 406 are secured to one or more brackets on equipment rack 404.

Figure 4D:
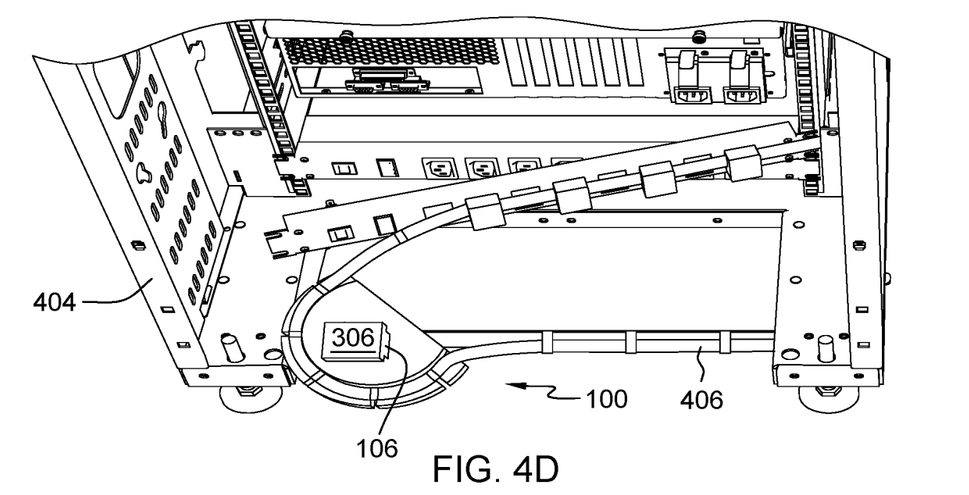
FIG. 4D depicts a secured cable disposed in a cable configuration tool mounted to a server rack with a second cable retainer removed, in accordance with an embodiment of the present invention.

FIG. 4D depicts a secured cable disposed in a cable configuration tool mounted to a server rack with a second cable retainer removed, in accordance with an embodiment of the present invention. Subsequent to cable harness 406 being created and secured to the one or more brackets of equipment rack 406, cable configuration tool 100 is disassembled. In this embodiment, the second cable retainer 102 (not illustrated) is removed exposing cable harness 406 with the five tie-off points along the radius bend as defined by cable guide 104. Depending on accessibility constraints, attachment base 106 with the first cable retainer 102 and cable guide 104 can be removed as a single entity. Alternatively, the remaining components of cable configuration tool 100 can be disassembled in a reverse order with cable guide 104 being removed from attachment base 106, followed by the first cable retainer 102 being removed from attachment base 106, and attachment base 106 being dismounted from edge 402 of equipment rack 404.

Figure 4E:
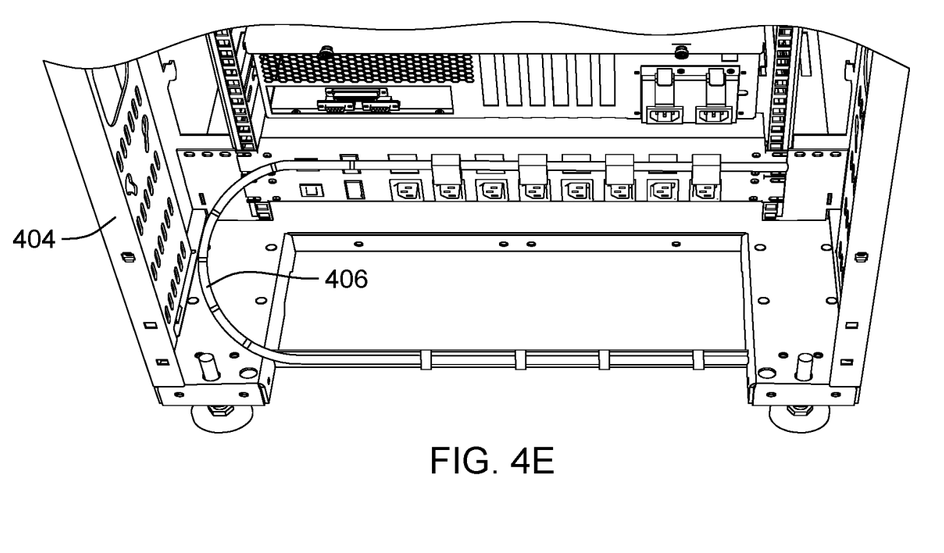
FIG. 4E depicts a secured cable installed in the server rack with a cable configuration tool removed, in accordance with an embodiment of the present invention.

FIG. 4E depicts a secured cable installed in the server rack with a cable configuration tool removed, in accordance with an embodiment of the present invention. In this embodiment, all components of cable configuration tool 100 are completely removed from equipment rack 404, exposing a final resting position of cable harness 406. With cable configuration tool 100 removed, cable harness 406 maintains the bend radius as defined by cable guide 104 due to the five tie-off points defined by the five T-shaped cavities of the first and the second cable retainer 102.

Figure 5A:
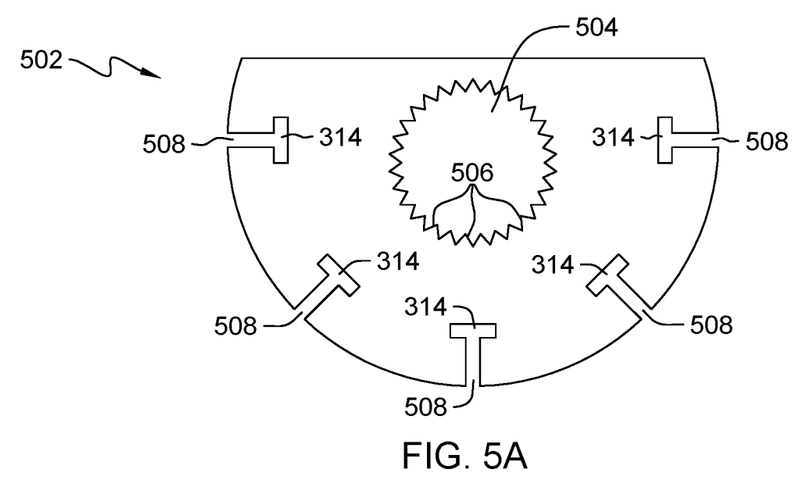
FIG. 5A depicts a varying position cable retainer of a cable configuration tool, in accordance with an embodiment of the present invention.

FIG. 5A depicts a varying position cable retainer of a cable configuration tool, in accordance with an embodiment of the present invention. In this embodiment, varying position cable retainer 502 includes aperture 504 with a plurality of cogs 506 (i.e., teeth) positioned on a circumference of aperture 504. Similar to cable retainer 102, T-shaped cavities 508 are positioned around a circumference of varying position cable retainer 502 for providing cable harness loop and tie off points for securing two or more cables to create the cable harness. Area 510 represents a portion of each T-shaped cavity 508 for placing a fastener for securing the two or more cable for creation of the cable harness, where the fastener can be a section of tape, a zip-tie, and a hook-and-loop fastener.

Figure 5B:
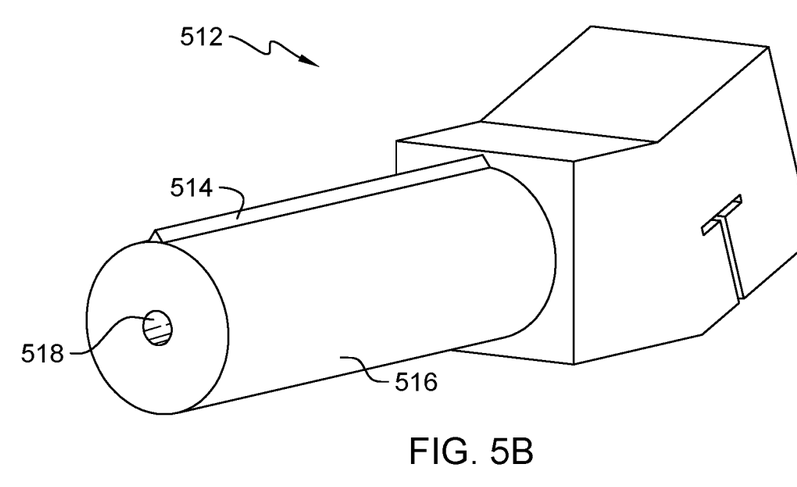
FIG. 5B depicts an attachment base of a cable configuration tool for a varying position cable retainer, in accordance with an embodiment of the present invention.

FIG. 5B depicts an attachment base of a cable configuration tool for a varying position cable retainer, in accordance with an embodiment of the present invention. In this embodiment, attachment base 512 include alignment cog 514 protruding from an exterior surface of arm 516, where alignment cog 514 is placeable between two of the plurality of cogs 506 of varying position cable retainer 502. A location of varying position able retainer 502 on arm 516 of attachment base 512 is defined by a position of alignment cog 514 between two of the plurality of cogs 506 of varying position cable retainer 502. Furthermore, cable guide 104 of FIG. 3C can utilize a similar guide aperture 312 design as aperture 504 of varying position cable retainer 502, with the plurality of cogs 506 positioned on a circumference of aperture 504. In this embodiment, arm 516 includes cavity 518 at a first end for accepting a member protruding from a securement body, where the securement body is coupled to the first end of arm 516 by placing the member inside cavity 518. In one embodiment, the member protruding from the securement body and cavity 518 utilizes a bolt and nut combination for coupling the securement body to arm 516 of attachment base 512.

The terminology used herein is for the purpose of describing particular embodiments only and is not intended to be limiting to the invention. As used herein, the singular forms "a", "an" and "the" are intended to include the plural forms as well, unless the context clearly indicates otherwise.

Having described preferred embodiments of a modular cabling fixture (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. An apparatus for a cable configuration tool, the apparatus comprising:
   an attachment base, a first cable retainer, a second cable retainer, and a cable guide, wherein the attachment base includes an attachment point for mounting to an edge of an enclosure, wherein the attachment base includes an arm for mounting the first cable retainer, the second cable retainer, and the cable guide;
   a first aperture of the first cable retainer configured to accept the arm of the attachment base, wherein the first cable retainer is slidable along the arm;
   a first plurality of cogs positioned on a circumference of the first aperture, wherein an alignment cog protruding from an exterior surface of the arm is placeable between at least two cogs of the first plurality of cogs;
   a second aperture of the second cable retainer configured to accept the arm of the attachment base, wherein the second cable retainer is slidable along the arm;
   a third aperture of the cable guide configured to accept the arm of the attachment base, wherein the cable guide is slidable along the arm and positioned between the first cable retainer and the second cable retainer; and
   one or more cables for creation of a cable harness are placeable along an outer edge of the cable guide, wherein the cable guide defines a bend radius for the one or more cables.

2. The apparatus of claim 1, wherein the cable guide further defines a bend degree for the one or more cables for the creation of the cable harness.

3. The apparatus of claim 2, further comprising:
   a first set of one or more cavities positioned around an edge of the first cable retainer, wherein each cavity from the first set of one or more cavities includes an area for insertion of a cable fastener for securing the one or more cables for the creation of the cable harness.

4. The apparatus of claim 3, further comprising:
   a second set of one or more cavities positioned around an edge of the second cable retainer, wherein each cavity from the second set of one or more cavities includes an area for insertion of a cable fastener for securing the one or more cables for the creation of the cable harness.

5. The apparatus of claim 4, wherein each cavity from the first set of one or more cavities at least partially aligns with a corresponding cavity from the second set of one or more cavities.

6. The apparatus of claim 2, wherein a first radius of the first cable retainer and a second radius of the second cable retainer are each greater than a third radius of the cable guide.

7. The apparatus of claim 6, further comprising:
   a channel defined by the outer edge of the cable guide, the first cable retainer, and the second cable retainer, wherein the one or more cables for the creation of the cable harness are placeable in the channel.

8. The apparatus of claim 7, wherein the first radius is equal to the second radius and a height of the channel is by a difference in the first radius and the third radius.

9. The apparatus of claim 7, wherein a height of the channel is defined by a difference in first radius and the third radius.

10. The apparatus of claim 7, wherein a height of the channel is defined by a difference in second radius and the third radius.

11. The apparatus of claim 1, further comprising:
    a body positioned at a first end of the arm, wherein the body secures the first cable retainer, the second cable retainer, and the cable guide on the arm of the attachment base.

12. The apparatus of claim 11, wherein the body is attachable to the first end of the arm utilizing a bolt and nut combination.

13. The apparatus of claim 1, wherein a cross section of the first aperture at least partially aligns with a cross section of the arm.

14. The apparatus of claim 13, wherein a cross section of the second aperture at least partially aligns with the cross section of the arm.

15. The apparatus of claim 14, wherein a cross section of the third aperture at least partially aligns with the cross section of the arm.

16. The apparatus of claim 1, further comprising:
a second plurality of cogs positioned on a circumference of the second aperture, wherein the alignment cog protruding from the exterior surface of the arm is placeable between at least two cogs of the second plurality of cogs.

17. The apparatus of claim 16, further comprising:
a third plurality of cogs positioned on a circumference of the third aperture, wherein the alignment cog protruding from the exterior surface of the arm is placeable between at least two cogs of the third plurality of cogs.

* * * * *